(12) United States Patent
Fujita

(10) Patent No.: US 11,877,101 B2
(45) Date of Patent: Jan. 16, 2024

(54) IMAGE DISPLAY APPARATUS

(71) Applicant: SONY CORPORATION, Tokyo (JP)

(72) Inventor: Keiko Fujita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 21 days.

(21) Appl. No.: 16/767,344

(22) PCT Filed: Oct. 17, 2018

(86) PCT No.: PCT/JP2018/038632
§ 371 (c)(1),
(2) Date: May 27, 2020

(87) PCT Pub. No.: WO2019/111548
PCT Pub. Date: Jun. 13, 2019

(65) Prior Publication Data
US 2020/0404230 A1 Dec. 24, 2020

(30) Foreign Application Priority Data

Dec. 4, 2017 (JP) .................................. 2017-232585

(51) Int. Cl.
*H04N 9/31* (2006.01)

(52) U.S. Cl.
CPC ......... *H04N 9/3144* (2013.01); *H04N 9/3155* (2013.01)

(58) Field of Classification Search
CPC .. H04N 9/3144; H04N 9/3155; H04N 9/3161; H04N 9/3194; H04N 9/312; H04N 9/3164; G03B 21/00; G03B 21/14; G03B 21/2053; G03B 21/145; G03B 17/54; G09G 5/10; H05B 47/11
See application file for complete search history.

(56) References Cited

U.S. PATENT DOCUMENTS

| | | | |
|---|---|---|---|
| 8,727,539 B2 * | 5/2014 | Todoroki | H04N 9/3194 353/69 |
| 2004/0113044 A1 | 6/2004 | Ishiguchi | |

(Continued)

FOREIGN PATENT DOCUMENTS

| | | |
|---|---|---|
| JP | 2004-193029 A | 7/2004 |
| JP | 2007-11163 A | 1/2007 |

(Continued)

OTHER PUBLICATIONS

International Search Report dated Jan. 8, 2019 in PCT/JP2018/038632 filed Oct. 17, 2018, 3 pages.

*Primary Examiner* — Michael Lee
(74) *Attorney, Agent, or Firm* — Oblon, McClelland, Maier & Neustadt, L.L.P.

(57) ABSTRACT

An image display apparatus according to an embodiment of the present technology includes a light source section, a first sensor, a second sensor, and a light source control section. The light source section is capable of emitting emitted light. The first sensor is capable of detecting a state of the emitted light. The second sensor is capable of detecting a temperature of the light source section. The light source control section is capable of controlling the light source section according to a first detection result of detection performed by the first sensor, and a second detection result of detection performed by the second sensor.

19 Claims, 10 Drawing Sheets

(56) References Cited

U.S. PATENT DOCUMENTS

| | | | |
|---|---|---|---|
| 2006/0125773 A1* | 6/2006 | Ichikawa | G09G 3/3413 345/102 |
| 2008/0165815 A1* | 7/2008 | Kamijima | H01S 5/14 372/34 |
| 2013/0070208 A1* | 3/2013 | Nakanishi | G03B 21/16 353/31 |
| 2015/0022568 A1* | 1/2015 | Ishii | H04N 9/3161 345/697 |
| 2015/0212400 A1* | 7/2015 | Nakanishi | G03B 21/2033 353/31 |
| 2016/0050400 A1* | 2/2016 | Terasaki | G03B 21/2013 353/20 |
| 2016/0255319 A1* | 9/2016 | Miyamoto | G02F 1/0147 348/602 |
| 2017/0208303 A1* | 7/2017 | Toyooka | G02B 27/286 |
| 2017/0277031 A1* | 9/2017 | Miyakawa | G02B 26/0833 |
| 2018/0042088 A1* | 2/2018 | Uchiike | G01J 1/0228 |
| 2018/0330659 A1* | 11/2018 | Oki | A61B 1/0638 |
| 2020/0041881 A1* | 2/2020 | Homma | H04N 9/3194 |

FOREIGN PATENT DOCUMENTS

| | | |
|---|---|---|
| JP | 2007-219008 A | 8/2007 |
| JP | 2008193054 A | 8/2008 |
| JP | 2010-117613 A | 5/2010 |
| JP | 2014-81585 A | 5/2014 |
| WO | WO-2011148507 A1 | 12/2011 |
| WO | WO 2014/196124 A1 | 12/2014 |

\* cited by examiner

IMAGE DISPLAY APPARATUS

TECHNICAL FIELD

The present technology relates to an image display apparatus such as a projector.

BACKGROUND ART

Conventionally, an image display apparatus such as a projector has been widely used. For example, light from a light source is modulated by a light modulator such as a liquid crystal element, and the modulated light is projected onto, for example, a screen so that an image is displayed on the screen. For example, a mercury lamp, a xenon lamp, a light emitting diode (LED), or a laser diode (LD) is used as the light source. From among the light sources, a solid-state light source such as an LED or an LD has a long life and thus there is no need for a lamp change performed in the past. Further, the solid-state light source also has the advantage of being lighted immediately after the power is turned on.

Patent Literature 1 discloses an image display apparatus that includes an environmental temperature sensor, a light source temperature sensor, and an optical system temperature sensor. The environmental temperature sensor is arranged in the vicinity of an inlet and is capable of measuring an external temperature. The light source temperature sensor is capable of measuring a temperature of a laser light source, and the optical system temperature sensor is capable of measuring a temperature of an illumination optical system. The longer operating life of the image display apparatus is achieved by controlling the device as appropriate according to the temperatures measured by the respective temperature sensors (for example, paragraphs [0102], [0103], [0113], [0124], and [0131] of the specification and FIG. 1 in Patent Literature 1).

CITATION LIST

Patent Literature

Patent Literature 1: WO2014/196124

DISCLOSURE OF INVENTION

Technical Problem

In an image display apparatus such as a projector, there may be a decrease in brightness due to, for example, a temporal change in a light source that is caused by aging. In order to prevent such a problem, a technology is desired that makes it possible to control a light source accurately.

In view of the circumstances described above, it is an object of the present technology to provide an image display apparatus that makes it possible to control a light source accurately.

Solution to Problem

In order to achieve the object described above, an image display apparatus according to an embodiment of the present technology includes a light source section, a first sensor, a second sensor, and a light source control section.

The light source section is capable of emitting emitted light.

The first sensor is capable of detecting a state of the emitted light.

The second sensor is capable of detecting a temperature of the light source section.

The light source control section is capable of controlling the light source section according to a first detection result of detection performed by the first sensor, and a second detection result of detection performed by the second sensor.

In this image display apparatus, the state of the emitted light and the temperature of the light source section are respectively detected by the first and second sensors. It is possible to accurately control the light source section using these detection results.

When the second detection result is lower than a specified reference temperature, the light source control section may control the light source section such that intensity of the emitted light emitted from the light source section is maintained constant.

When the second detection result is higher than the specified reference temperature, the light source control section may control the light source section such that an increase in the temperature of the light source section is suppressed.

When the second detection result is higher than the specified reference temperature, the light source control section may control the light source section such that the intensity of the emitted light emitted from the light source section is maintained constant while an increase in the temperature of the light source section is being suppressed.

The light source section may include at least one light source that is driven by being supplied with current. In this case, the second sensor may detect a temperature of the at least one light source as the temperature of the light source section. Further, the light source control section may control the current supplied to the at least one light source.

When the second detection result is higher than a specified reference temperature, the light source control section may control an increase rate used to increase the current supplied to the at least one light source.

When the second detection result is higher than a first temperature that is higher than the specified reference temperature, the light source control section may prevent the current supplied to the at least one light source from being increased.

When the second detection result is lower than the specified reference temperature, the light source control section may set a first increase rate to be the increase rate used to increase the current supplied to the at least one light source.

When the second detection result is within a range of from the specified reference temperature to the first temperature, the light source control section may set a second increase rate to be the increase rate used to increase the current supplied to the at least one light source, the second increase rate being lower than the first increase rate.

When the second detection result is within a range of from the first temperature to a second temperature that is higher than the first temperature, the light source control section may decrease the current supplied to the at least one light source, using a first decrease rate.

When the second detection result is within a range of from the second temperature to a third temperature that is higher than the second temperature, the light source control section may decrease the current supplied to the at least one light source, using a second decrease rate that is higher than the first decrease rate.

When the second detection result is higher than the third temperature, the light source control section may stop the supply of the current to the at least one light source.

A temperature that is lower than an upper limit of an operation guarantee temperature of the light source section may be set to be the specified reference temperature, the upper limit of the operation guarantee temperature being used as a reference.

Temperatures that are lower than an upper limit of an operation guarantee temperature of the light source section may be respectively set to be the first temperature, the second temperature, and the third temperature, the upper limit of the operation guarantee temperature being used as a reference.

The image display apparatus may further include a third sensor and a generator.

The third sensor is capable of detecting an outside temperature.

The generator may generate state information regarding a state of the light source section using the first detection result of detection performed by the first sensor, the second detection result of detection performed by the second sensor, and a third detection result of detection performed by the third sensor.

The image display apparatus may further include a housing that includes an inlet used to intake outside air. In this case, the third sensor may be arranged near the inlet, and may detect, as the outside temperature, a temperature of the outside air intaken from the inlet.

The light source control section may control the light source section according to the generated state information.

The image display apparatus may further include an image generator and a projection section.

The image generator generates an image using the emitted light emitted from the light source section.

The projection section projects the image generated by the image generator.

Advantageous Effects of Invention

As described above, the present technology makes it possible to control a light source accurately. Note that the effect described here is not necessarily limitative and may be any effect described in the present disclosure.

MODE(S) FOR CARRYING OUT THE INVENTION

Embodiments according to the present technology will now be described below with reference to the drawings.

[Image Display Apparatus]

Figure 1:
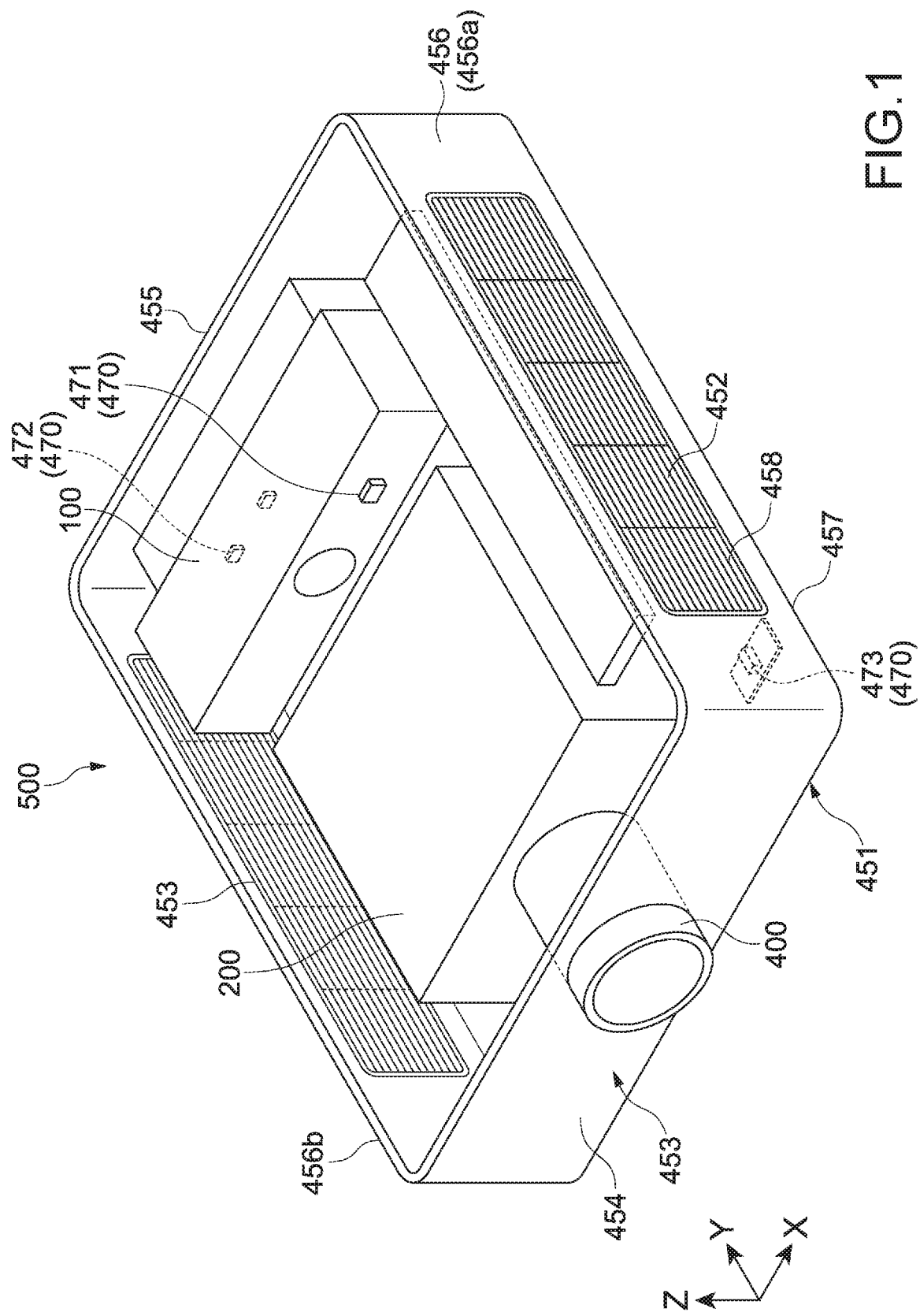
FIG. 1 schematically illustrates an example of a configuration of an image display apparatus according to an embodiment.

FIG. 1 schematically illustrates an example of a configuration of an image display apparatus according to an embodiment of the present technology. In the following descriptions, a left-right direction, a front-rear direction, and a height direction of an image display apparatus 500 are respectively referred to as an X direction, a Y direction, and a Z direction. Of course, the directions are not limited to being set as described above.

For example, the image display apparatus 500 is used as a projector for presentation or for digital cinema. The present technology described below is applicable to any image display apparatus used for other purposes.

The image display apparatus 500 includes a light source section 100, an image generator 200, a projection section 400, a housing 450, and a sensor mechanism 470.

The light source section 100 emits emitted light to the image generator 200. The image generator 200 generates an image using the emitted light emitted from the light source section 100. The projection section 400 projects the image generated by the image generator 200 onto, for example, a screen.

The housing 450 includes an outer frame 451, an inlet 452, and an outlet 453. The outer frame 451 is configured to surround the light source section 100, the image generator 200, and the projection section 400. The outer frame 451 has a shape of a substantially rectangular parallelepiped, and includes a front face 454, a rear face 455, side faces 456, a bottom face 457, and a top face. Note that, in FIG. 1, an illustration of the top face is omitted.

Of two side faces 456a and 456b of the outer frame 451, the inlet 452 is formed on the side face 456a that is one of the two side faces 456a and 456b, and is used to intake outside air. The outlet 453 is formed on the side face 456b that is the other side of the two side faces 456a and 456b, and is used to emit the air intaken from the inlet 452. In the present embodiment, the inlet 452 and the outlet 453 are each formed into a rectangular shape that extends in the front-rear direction (the Y direction) from the front face 454 to the rear face 455.

Outside air is intaken from the inlet 452 as cooling air, and is supplied to the inside of the image display apparatus 500. The air cools the inside of the image display apparatus 500, becomes warm, and is emitted to the outside from the outlet 453. A fan mechanism or the like may be provided near the inlet 452 or near the outlet 453 so that the outside air flows efficiently through the image display apparatus 500.

The sensor mechanism 470 includes a brightness sensor 471, a light source temperature sensor 472, and an environmental temperature sensor 473.

The brightness sensor 471 is arranged near the light source section 100, and is capable of detecting the intensity (brightness) of emitted light as a state of the emitted light. The specific configuration of the brightness sensor 471 is not limited, and any configuration may be adopted. Of course, an array sensor including a plurality of sensors, or an image sensor such as a CMOS sensor or a CCD sensor may be used.

Note that detecting a state of light includes any method that makes it possible to detect a state of detection-target light. For example, the detecting a state of light also includes a method for detecting a state of a portion of light included in the detection-target light, and a method for detecting a state of leaked light or diffracted light of the detection-target light.

The light source temperature sensor 472 is arranged in the light source section 100, and is capable of detecting a temperature of the light source section 100. The environmental temperature sensor 473 is arranged near the inlet 452, and is capable of detecting an outside temperature. In the present embodiment, the temperature of outside air intaken from the inlet 452 is detected by the environmental temperature sensor 473 as the outside temperature.

The specific configurations of the light source temperature sensor 472 and the environmental temperature sensor 473 are not limited, and any configurations may be adopted. In the present embodiment, the brightness sensor 471, the light source temperature sensor 472, and the environmental temperature sensor 473 respectively serve as a first sensor, a second sensor, and a third sensor.

Figure 2:
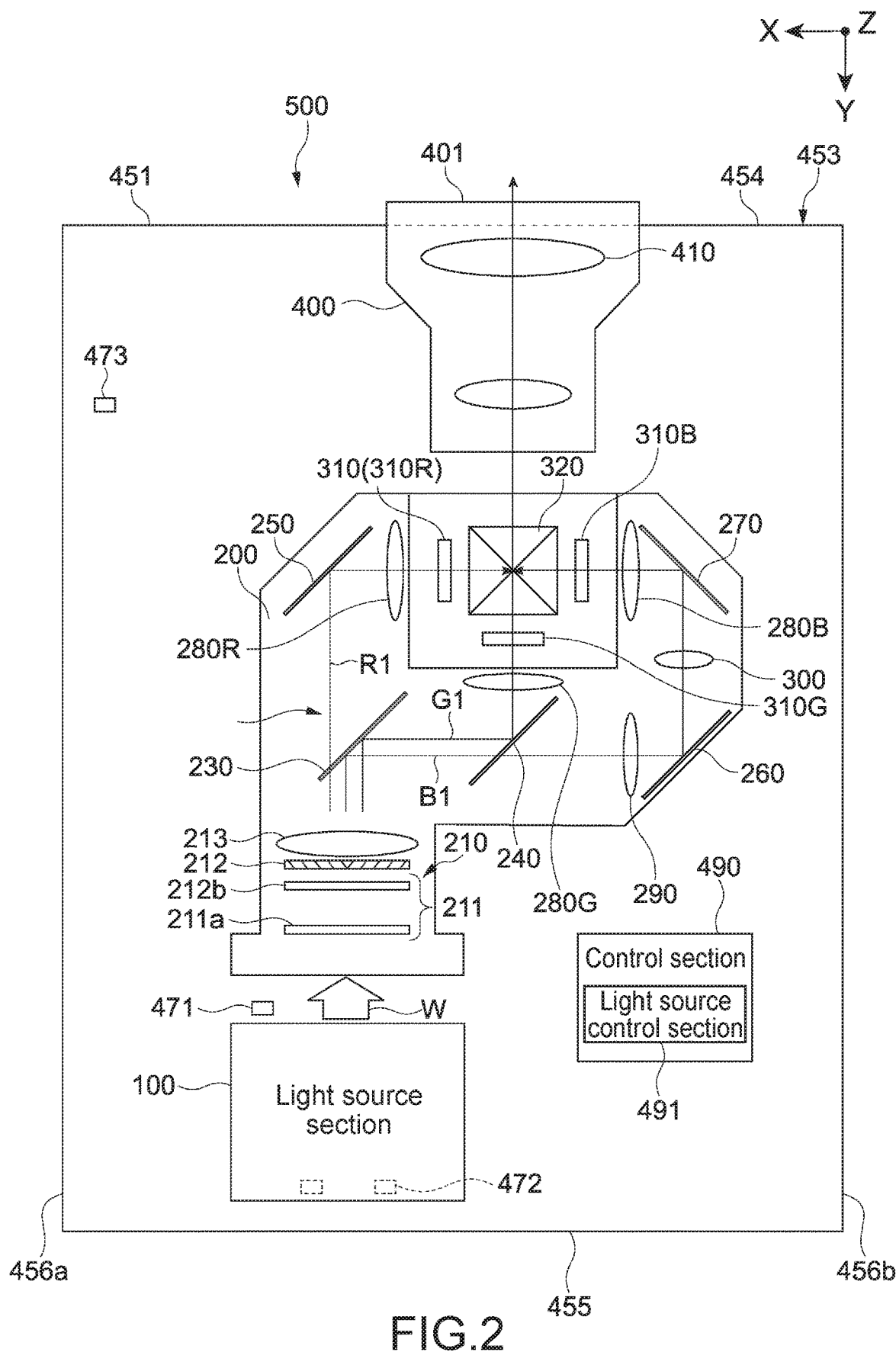
FIG. 2 schematically illustrates an example of a configuration of an image generator and a projection section.

Further, the image display apparatus 500 includes a controller (a control section) 490 that controls an overall operation of the image display apparatus 500 (refer to FIG. 2). The controller 490 has a hardware configuration including, for example, a CPU and a memory (a RAM and a ROM) that are necessary for a computer. Various processes are performed by the CPU loading, into the RAM, a control program stored in, for example, a memory and executing the program.

For example, a programmable logic device (PLD) such as a field programmable gate array (FPGA) or another device such as an application specific integrated circuit (ASIC) may be used as the controller 490. Further, the position at which the controller 490 is arranged, and the like are also not limited, and the arrangement and the like may be designed as appropriate.

In the present embodiment, a light source control section 491 is implemented by the CPU of the controller 490 executing a specified program (refer to FIG. 2). In order to implement the light source control section 491, dedicated hardware such as an integrated circuit (IC) may be used as appropriate. Further, in the present embodiment, a storage is implemented by, for example, the memory of the controller 490. Of course, the storage including, for example, a ROM or an HDD may be provided independently of the controller 490.

FIG. 2 schematically illustrates an example of a configuration of the image generator 200 and the projection section 400. As illustrated in FIG. 2, the light source section 100, the image generator 200, and the projection section 400 are arranged from the rear face 455 to the front face 454 of the outer frame 451. The projection section 400 is arranged such that an exit surface 401 of the projection section 400 protrudes outward from the front face 454.

In the present embodiment, white light W including red light, green light, and blue light is emitted by the light source section 100 as emitted light. Further, an image is generated by the image generator 200 using the white light W emitted from the light source section 100.

The image generator 200 includes an integrator optical system 210 and an illumination optical system 220. The integrator optical system 210 includes an integrator element 211, a polarization conversion element 212, and a condenser lens 213.

The integrator element 211 includes a first fly eye lens 211a and a second fly eye lens 211b, the first fly eye lens 211a including a plurality of two-dimensionally arranged microlenses, the second fly eye lens 211b including a plurality of microlenses arranged to each correspond to a respective one of the plurality of two-dimensionally arranged microlenses included in the first fly eye lens 211a.

The white light W having entered the integrator element 211 is split into a plurality of light beams by the microlenses of the first fly eye lens 211a, and images of the light beams obtained by the split are respectively formed on the corresponding microlenses provided to the second fly eye lens 211b. The microlenses provided to the second fly eye lens 211b each serve as a secondary light source, and the integrator element 211 emits a plurality of collimated beams of a uniform brightness to the polarization conversion element 212 situated at the output side of the integrator element 211.

The polarization conversion element 212 includes a function that maintains a polarization state of incident light that enters through the integrator element 211. The light that has passed through the polarization conversion element 212 is emitted to the illumination optical system 220 through the condenser lens 213.

The integrator optical system 210 includes, as a whole, a function that performs adjustment such that the white light W directed to the illumination optical system 220 has a distribution of uniform brightness so that the white light W is adjusted to light in a maintained polarization state. The specific configuration of the integrator optical system 210 is not limited.

The illumination optical system 220 includes dichroic mirrors 230, 240, 250, 260, and 270, field lenses 280R, 280G, and 280B, relay lenses 290 and 300, liquid crystal light valves 310R, 310G, and 310B, and a dichroic prism 320, the liquid crystal light valves 310R, 310G, and 310B serving as an image generation element.

The dichroic mirrors 230 to 270 have the characteristics in that colored light of a specified wavelength band is selectively reflected off each of the dichroic mirrors 230 to 270, and light of a wavelength band that is other than the light of the specified wavelength band is transmitted through the dichroic mirror. Green light G1 and blue light B1 that are included in white light W are selectively reflected off the dichroic mirror 230, and red light R1 included in the white light W is transmitted through the dichroic mirror 230.

The green light G1 reflected off the dichroic mirror 230 is selectively reflected off the dichroic mirror 240, and the blue light B reflected off the dichroic mirror 230 is transmitted through the dichroic mirror 240. Accordingly, light is split into pieces of light of different colors to be guided to different light paths. Note that a configuration for splitting light into pieces of light of respective colors that are red, green, and blue, and a used device are not limited.

The red light R1 obtained by the split is reflected off the dichroic mirror 250, is collimated by the field lens 280R, and then enters the liquid crystal light valve 310R for modulating red light. The green light G1 is collimated by the field lens 280G, and then enters the liquid crystal light valve 310G for modulating green light.

The blue light B1 passes through the relay lens 290 to be reflected off the dichroic mirror 260, and further passes through the relay lens 300 to be reflected off the dichroic mirror 270. The blue light B1 reflected off the dichroic mirror 270 is collimated by the field lens 280B, and then enters the liquid crystal light valve 310B for modulating blue light.

The liquid crystal light valves 310R, 310G, and 310B are electrically connected to a signal source (such as a PC) that is not illustrated and provides an image signal that includes image information. The liquid crystal light valves 310R, 310G, and 310B modulate incident light for each pixel according to provided image signals of respective colors, and respectively generate a red image, a green image, and a blue image. The pieces of modulated light of the respective colors (formed images) enter the dichroic prism 320, and are combined. The dichroic prism 320 superimposes the pieces of light of the respective colors that respectively enter from three directions to combine these pieces of light, and emits the combined pieces of light to the projection section 400.

The projection section 400 projects an image generated by the image generator 200. The projection section 400 includes, for example, a plurality of lenses 410, and projects, onto a screen or the like (not illustrated), light obtained by the combining performed by the dichroic prism 320. Accordingly, a full-color image is displayed. The specific configuration of the projection section 400 is not limited.

Figure 3:
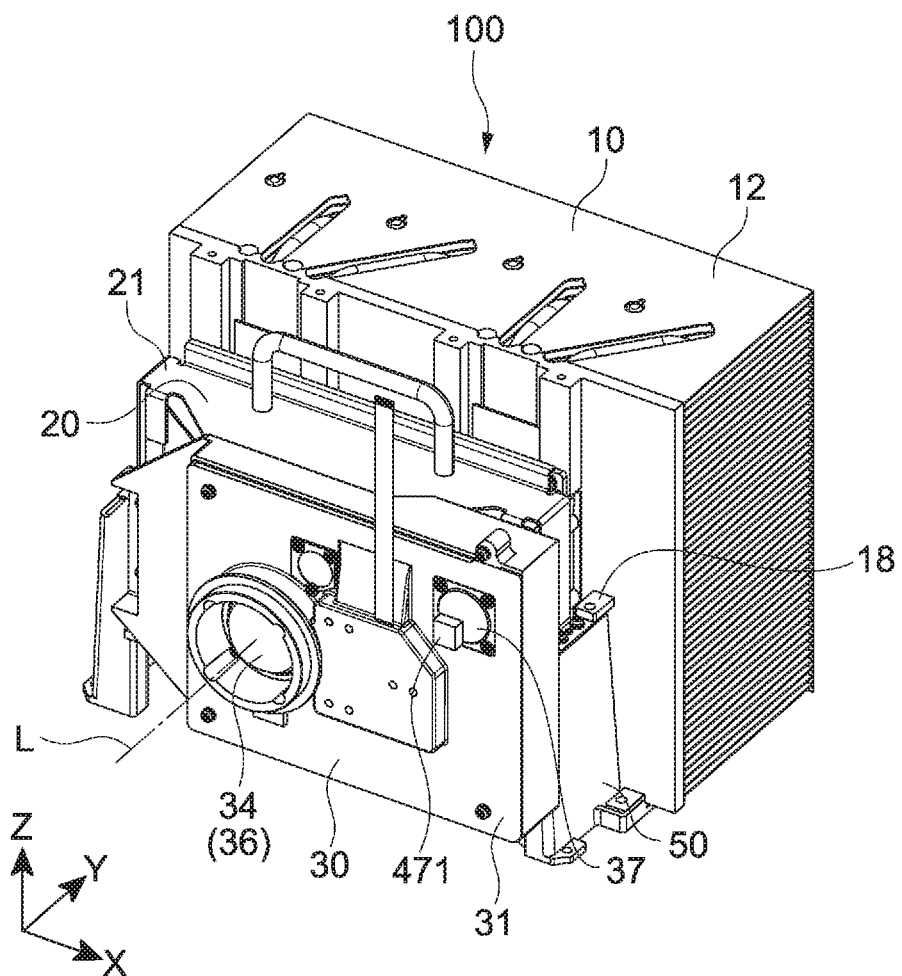
FIG. 3 is a perspective view of an example of a configuration of a light source section.
Figure 4:
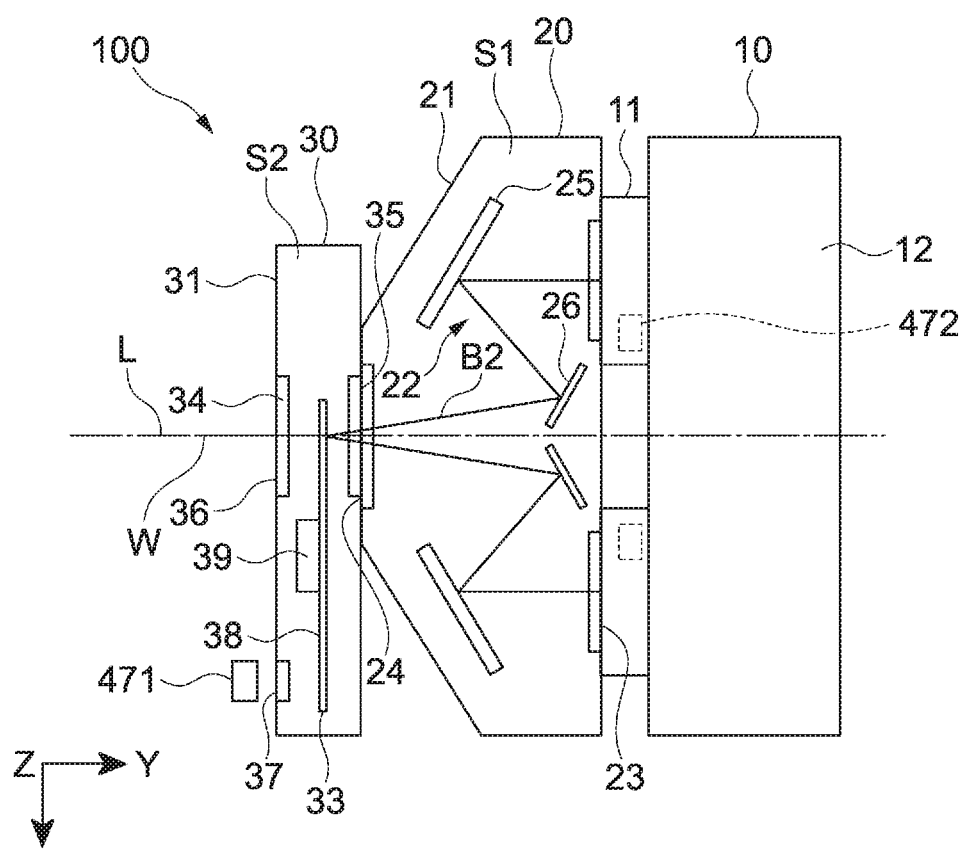
FIG. 4 schematically illustrates an example of an inside configuration of the light source section.

FIG. 3 is a perspective view of an example of a configuration of the light source section 100. FIG. 4 schematically illustrates an example of an inside configuration of the light source section 100. The light source section 100 includes a light source unit 10, an optical system unit 20, a phosphor unit 30, and a base 50 that supports the light source unit 10, the optical system unit 20, and the phosphor unit 30.

It is assumed that the side from which white light W is emitted is a front side, and the opposite side is a rear side. The light source unit 10, the optical system unit 20, and the phosphor unit 30 are supported by the base 50 to be arranged in this order from the rear side to the front side. Note that an illustration of the base 50 is omitted in FIG. 4.

The base 50 has an elongated shape extending in the left-right direction (the X direction). A support mechanism for supporting the light source unit 10, the optical system unit 20, and the phosphor unit 30 is provided to the base 50. The specific configuration of the support mechanism is not limited, and the support mechanism may be designed discretionarily.

Figure 5:
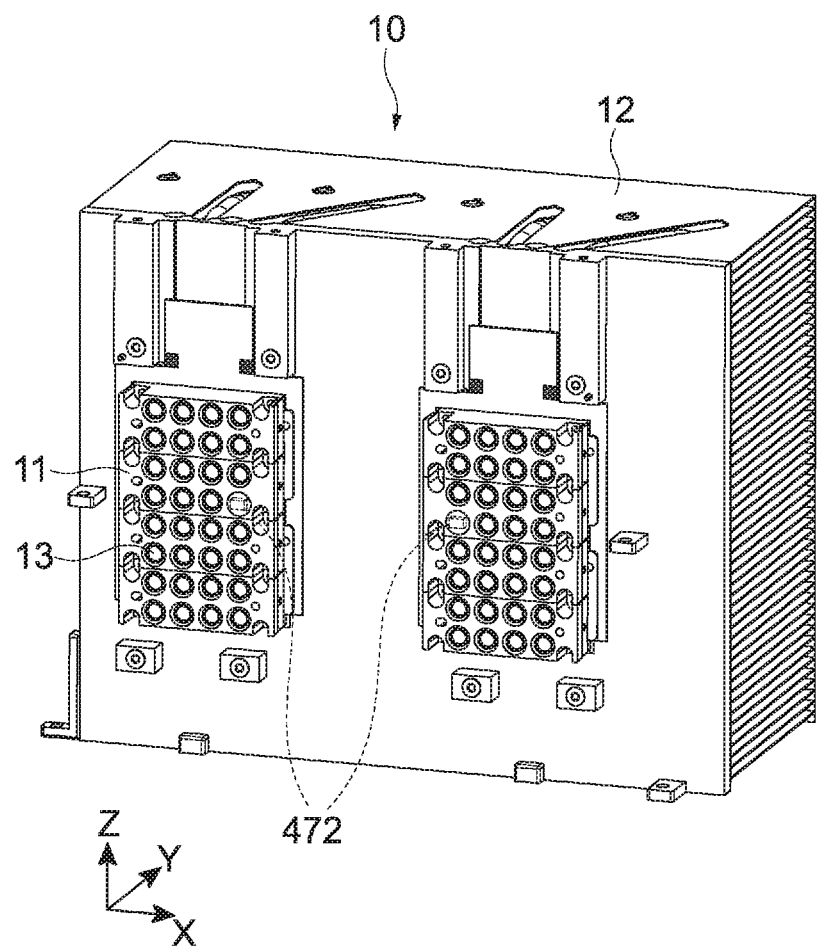
FIG. 5 is a perspective view of an example of a configuration of a light source unit.

FIG. 5 is a perspective view of an example of a configuration of the light source unit 10. As illustrated in FIGS. 4 and 5, the light source unit 10 includes two light source blocks 11 that are arranged in the X direction, and a heat sink 12 that is arranged behind the two light source blocks 11, the two light source blocks 11 and the heat sink 12 being configured as a unit.

Each light source block 11 includes a plurality of laser light sources (laser diodes) 13 driven by being supplied with current. The plurality of laser light sources 13 is arranged such that laser light is emitted toward the front side, where the front-rear direction is an optical-axis direction.

In the present embodiment, for example, a blue laser light source is used as the plurality of laser light sources 13, the blue laser light source being capable of emitting blue laser light B2 having a peak wavelength of emission intensity in a wavelength range between 400 nm and 500 nm. In the present embodiment, the plurality of laser light sources 13 corresponds to at least one light source.

Another solid-state light source such as an LED may be used as the at least one light source. Further, the present technology is also applicable when a mercury lamp, a xenon lamp, or the like is used. Furthermore, the wavelength band of emitted light is also not limited, and may be set discretionarily.

Note that, in FIG. 5, an illustration of one of the laser light sources 13 is omitted in each light source block 11 in order to describe a position of the light source temperature sensor 472. In the light source block 11 on the left in the figure, an illustration of the fourth laser light source 13 from the top in the rightmost column is omitted. In the light source block 11 on the right in the figure, an illustration of the fourth laser light source 13 from the top in the leftmost column is omitted. Of course, the light source 13 is also arranged at those positions.

As illustrated in FIG. 4, the optical system unit 20 includes a housing 21 in which a hermetically sealed space S1 is formed, and a light collection optical system 22 that is accommodated in the hermetically sealed space S1. Two entrance apertures 23 are each formed at a position on a rear-side surface of the housing 21, the entrance aperture 23 being an aperture that the blue laser light B2 enters, the position facing the light source block 11. An exit aperture 24 is formed on a front-side surface of the housing 21, the exit aperture 24 being an aperture from which the blue laser light B2 collected by the light collection optical system 22 is emitted.

The two entrance apertures 23 and the exit aperture 24 are hermetically sealed with any transparent member such as glass or plastic. Note that the hermetically sealed space S1 may be provided by the entrance apertures 23 being opened and connected to the light source unit 10 and by the exit aperture 24 being opened and connected to the phosphor unit 30.

The light collection optical system 22 includes two aspheric mirrors 25 (illustrated in the form of a plate in the figure) and two flat mirrors 26. The blue laser light B2 that enters the entrance aperture 23 in the front-rear direction is reflected off the aspheric mirror 25 to be collected. The light reflected off the aspheric mirror 25 is reflected off the flat mirror 26 to be directed to the exit aperture 24. The configuration of the light collection optical system 22 is not limited, and any configuration may be adopted.

The phosphor unit 30 includes a housing 31 in which a hermetically sealed space S2 is formed, and a wheel section 33 that is accommodated in the hermetically sealed space S2, and an exit lens 34. An entrance aperture 35 is formed on a rear-side surface of the housing 31, the entrance aperture 35 being an aperture that the blue laser light B2 emitted from the exit aperture 24 of the optical system unit 20 enters. An exit aperture 36 is formed on a front-side surface of the housing 31, the exit aperture 36 being an aperture from which white light W is emitted. The exit aperture 36 is hermetically sealed with the exit lens 34.

Further, a window 37 is formed on the front-side surface of the housing 31. The entrance aperture 35 and the window 37 are hermetically sealed with a transparent member made of, for example, glass or plastic. In the present embodiment, the housing 31 serves as a hermetically sealed portion that includes a window and has a hermetically sealed space formed inside the hermetically sealed portion. Note that the hermetically sealed space S2 may be provided by the entrance aperture 35 being opened and connected to the optical system unit 20. In this case, the hermetically sealed portion is provided by the housings 31 and 21.

The wheel section 33 includes a phosphor wheel 38 and a motor 39. The phosphor wheel 38 is positioned so that the blue laser light B2 entering the entrance aperture 35 is collected at a specified point. The motor 39 is driven by electrical power supplied through, for example, a flexible printed circuit, and rotates the phosphor wheel 38.

Figure 6:
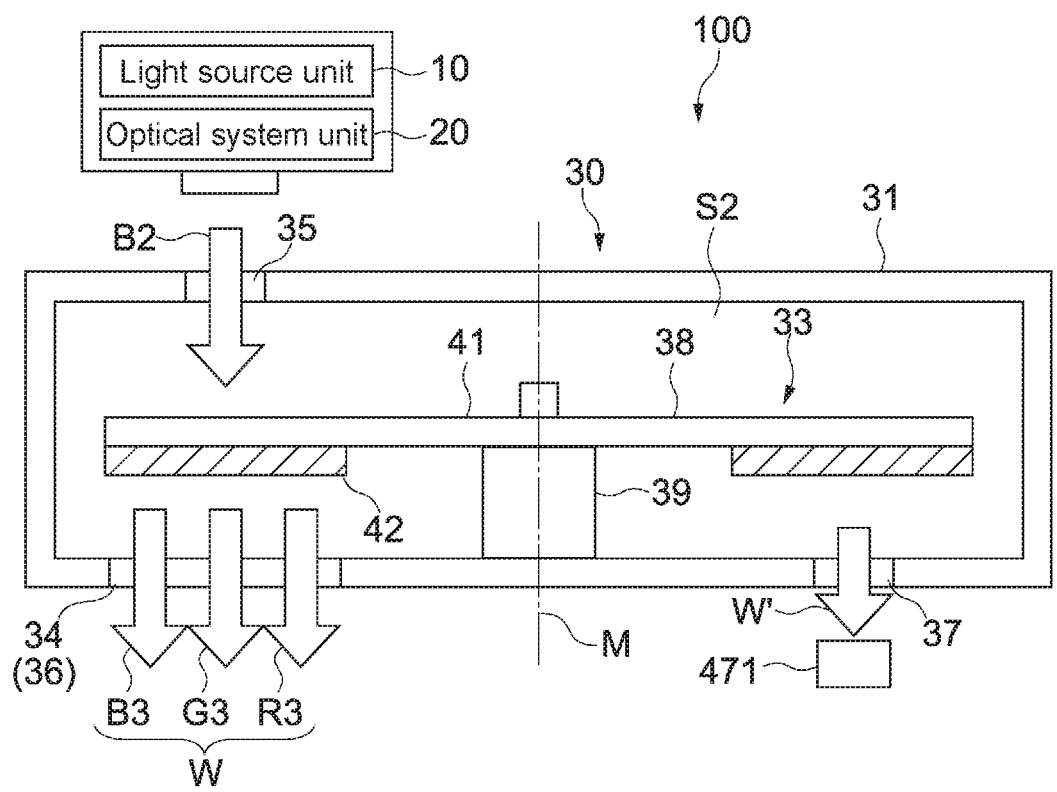
FIG. 6 is a diagram describing generation of white light W that is performed by a phosphor unit.

FIG. 6 is a diagram describing generation of white light W that is performed by the phosphor unit 30. The phosphor wheel 38 includes a disk-shaped substrate 41 through which blue laser light B2 is transmitted, and a phosphor layer 42 provided on the substrate 41. A crystalline member made of, for example, rock crystal or sapphire is used as the substrate 41.

The phosphor layer 42 includes a fluorescent substance that is excited by blue laser light B2 emitted by the plurality of laser light sources 13 and emits visible light. In the present embodiment, a portion of the blue laser light B2 is converted, by the phosphor layer 42, into light of a wavelength band including bands from a red wavelength to a green wavelength (that is, yellow light). Further, the portion of the blue laser light B2 is transmitted through the phosphor layer 42 without a change. Thus, light including the blue excitation light and the yellow fluorescence is emitted from the phosphor layer 42.

For example, an yttrium aluminum garnet (YAG) phosphor is used as the fluorescent substance included in the phosphor layer 42. Note that the type of the fluorescent substance, the wavelength band of the excitation light, and the wavelength band of the visible light generated by performing excitation are not limited.

In the present embodiment, the phosphor layer 42 corresponds to a light emitter that is excited by blue laser light B2 emitted from the plurality of laser light sources 13 and emits visible light. Any other substance different from a phosphor may be used as the light emitter.

The motor 39 is connected to a center portion of the substrate 41. The phosphor wheel 38 rotates about a rotation axis M by the motor 39 being driven.

Blue laser light B2 is emitted from the light source unit 10 in a state in which the substrate 41 is being rotated by the motor 39. The blue laser light B2 is collected by the optical system unit 20 and irradiated onto the phosphor layer 42 through the entrance aperture 35. The blue laser light B2 is irradiated onto the phosphor layer 42 in a relatively circular motion following the rotation of the substrate 41.

Accordingly, as illustrated in FIG. 6, white light W that includes blue laser light B3, green light G3, and red light R3 is emitted, the blue laser light B3 being transmitted through the phosphor layer 42, the green light G3 and the red light R3 being visible light from the phosphor layer 42. The white light W is emitted through the exit lens 34 (the exit aperture 36) along an optical axis L illustrated in FIGS. 3 and 4. In the present embodiment, the white light W corresponds to light that includes light from the plurality of laser light sources 13 and visible light from the phosphor layer 42.

Note that a configuration and a method for connecting each unit to the base 50, and a configuration and a method for connecting the respective units to one another are not limited, and any configuration and any method such as fitting, bonding, or screw clamp may be adopted.

[Sensor Mechanism]

As illustrated in FIGS. 3, 4, and 6, the brightness sensor 471 is arranged at a position that faces the window 37 formed in the housing 31 of the phosphor unit 30. Further, the intensity of leaked light W' emitted from the window 37 is detected. The leaked light W' is leaked light of white light W including blue laser light B3, green light G3, and red light R3. In other words, in the present embodiment, the intensity of leaked light W' of detection-target white light W is detected by the brightness sensor 471. The intensity of leaked light W' of white light W that is detected by the brightness sensor 471 corresponds to a first detection result.

Note that the position at which the brightness sensor 471 is arranged is not limited, and the brightness sensor 471 may be arranged at any position at which the brightness sensor 471 can detect the intensity of white light W. For example, the brightness sensor 471 may be arranged on the side of a back surface (a surface opposite to a reflective surface) of the dichroic mirror 250 or 270 in the image generator 200. Then, the intensity of the red light R1 or the blue light B1 may be detected, the red light R1 and the blue light B1 being included in the white light W. Further, the brightness sensor 471 may be arranged near the integrator optical system 210 to detect the intensity of leaked light or the like of white light W emitted from the polarization conversion element 212.

As illustrated in FIG. 5, one light source temperature sensor 472 is arranged in each of the two light source blocks 11. In the present embodiment, the light source temperature sensor 472 is arranged on the back side of one of the laser light sources 13 in each light source block 11.

In the light source block 11 on the left in the figure, the light source temperature sensor 472 is arranged on the back side of the fourth laser light source 13 from the top in the rightmost column. In the light source block 11 on the right in the figure, the light source temperature sensor 472 is arranged on the back side of the fourth laser light source 13 from the top in the leftmost column. For example, it is possible to implement the light source temperature sensor 472, together with a circuit that drives the light source temperature sensor 472, on a rear surface of an implementation substrate on which the laser light source 13 is implemented.

In the present embodiment, temperatures of the plurality of laser light sources 13 are detected by the light source temperature sensor 472 as a temperature of the light source section 100. Note that the position at which the light source temperature sensor 472 is arranged is not limited, and the arrangement of the light source temperature sensor 472 may be designed discretionarily. For example, the light source temperature sensor 472 may be arranged in the hermetically sealed space S1 or S2 to detect the temperature of the hermetically sealed space S1 or S2 as the temperature of the light source section 100. The light source temperature detected by the light source temperature sensor 472 corresponds to a second detection result.

As illustrated in FIG. 1, the environmental temperature sensor 473 is arranged near the inlet 452. A cooling structure for properly forming a flow passage of outside air of outside air is included inside the image display apparatus 500. For example, the cooling structure is implemented by using any member for directing air, such as a duct. Further, it is possible to implement any cooling structure, for example, due to the position of each mechanism or by forming, in each mechanism, an opening, a hole, or the like through which air passes.

The environmental temperature sensor 473 is arranged near the inlet 452 in the flow passage of outside air that is formed by the cooling structure. This makes it possible to accurately detect the outside temperature. Of course, the position at which the environmental temperature sensor 473 is arranged is not limited, and any position at which the environmental temperature sensor 473 can detect the outside temperature may be selected. For example, the environmental temperature sensor 473 may be arranged outside of the housing 450 to detect the outside temperature. The outside temperature detected by the environmental temperature sensor 473 corresponds to a third detection result.

[Control of Light Source Section]

Figure 7:
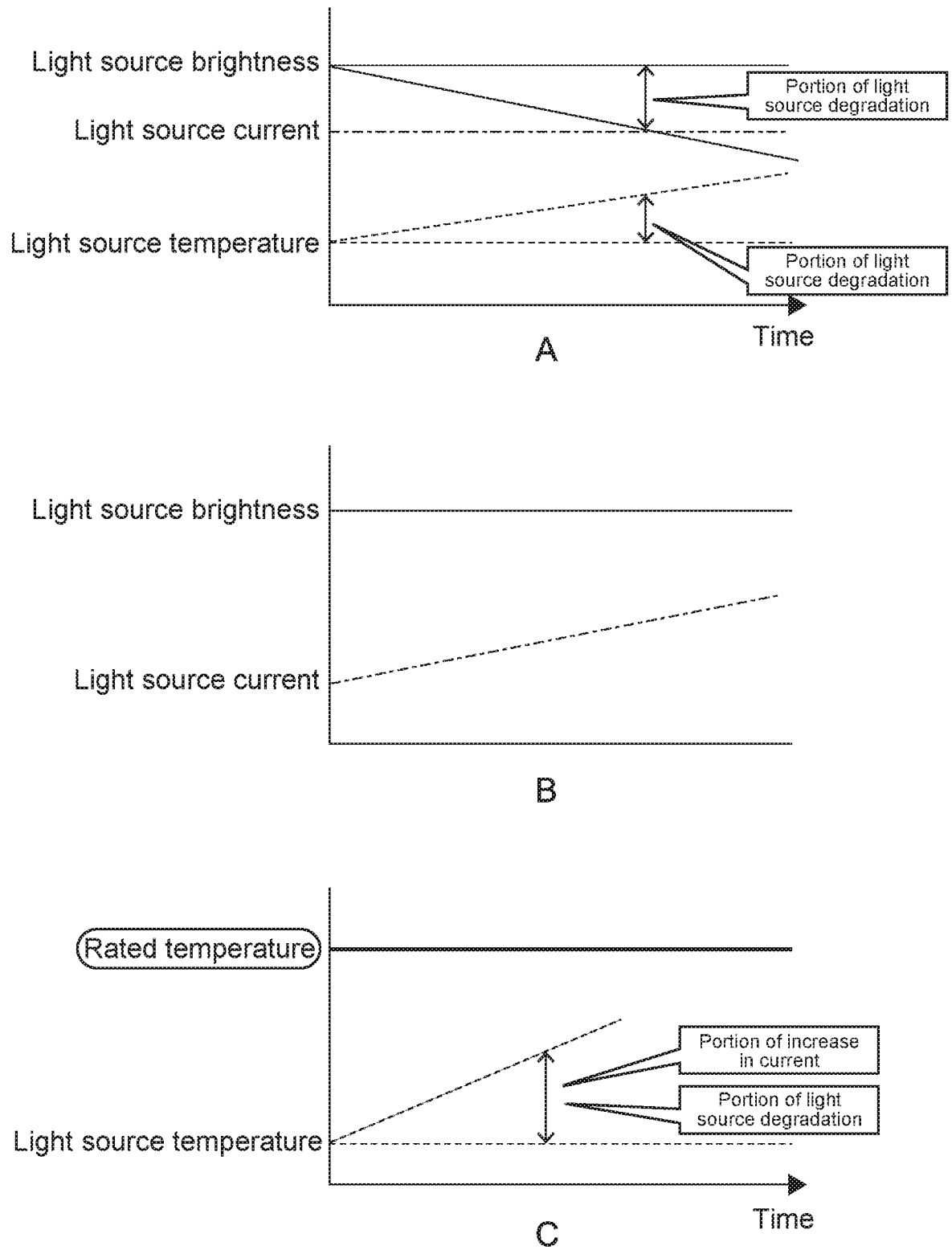
FIG. 7 is a schematic graph describing an outline of control of the light source section that is performed by a light source control section.

FIG. 7 is a schematic graph describing an outline of control of the light source section 100 that is performed by the light source control section 491. As illustrated in A of FIG. 7, the light source current supplied to the plurality of laser light sources 13 is maintained constant. Then, due to degradation of the light source 13 that is caused by aging, the light source brightness is decreased and the light source temperature is increased. For example, a portion of a decrease in the light source brightness and a portion of an increase in the light source temperature can be considered a portion of light source degradation.

Thus, in the present embodiment, as illustrated in B of FIG. 7, the light source brightness is maintained constant by increasing the light source current. Then, as illustrated in C of FIG. 7, an increase in the light source temperature depending on an increase in current occurs in addition to the portion of light source degradation. If the light source temperature exceeds an upper limit of a rated temperature (referred to as "Rated temperature" in the figure), this may result in a sharp decrease in brightness, breakage of an element, or the like.

In the present embodiment, as described below, the light source section 100 is controlled by the light source control section 491 according to the intensity of leaked light W' of white light W (hereinafter simply referred to as light source brightness) that is the first detection result of detection performed by the brightness sensor 471, and according to the light source temperature that is the second detection result of detection performed by the light source temperature sensor 472. In other words, the value of LD current supplied to the plurality of laser light sources 13 is controlled according to the light source brightness and the light source temperature.

This makes it possible to control the light source current while monitoring the light source temperature, and thus, it becomes possible to prevent the light source temperature from exceeding the upper limit of the rated temperature, and to prevent an early degradation or breakage of the laser light source 13. Note that, in the present embodiment, the upper limit of the rate temperature is an example of an upper limit of an operation guarantee temperature. A temperature other than the rated temperature may be set to be the upper limit of the operation guarantee temperature.

Further, the graph illustrated in FIG. 7 is a schematic graph. For example, a decrease in light source brightness, an increase in light source temperature, and the like due to degradation of an element in the light source are not limited to exhibiting a linear behavior. For example, the decrease in brightness and the increase in temperature may occur in various manners according to the characteristics, a temperature, or the like of the light source.

Figure 8:
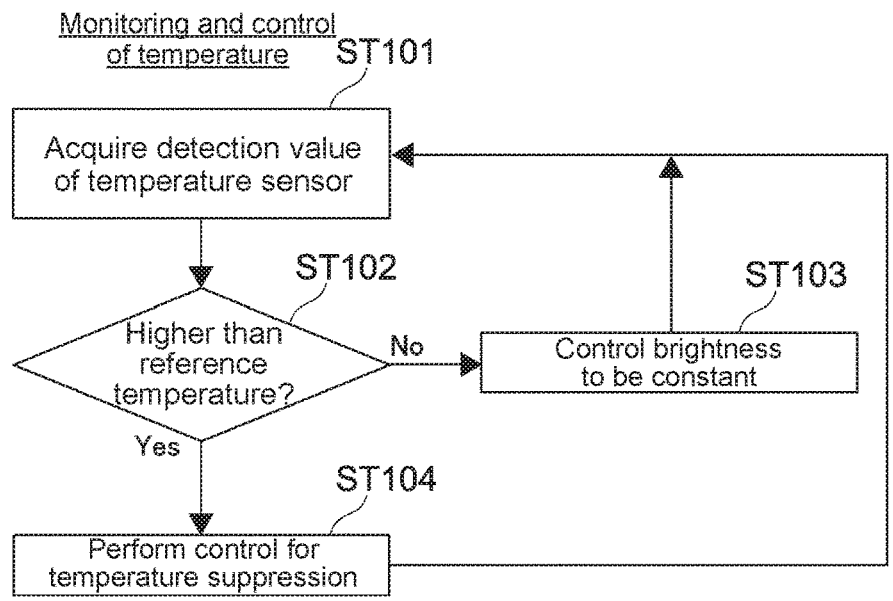
FIG. 8 is a flowchart illustrating an example of monitoring and control of a temperature.

FIG. 8 is a flowchart illustrating an example of monitoring and control of a temperature. A light source temperature detected by the light source temperature sensor 472 is acquired (Step 101). It is determined whether the light source temperature is higher than a specified reference temperature (Step 102).

When the light source temperature is lower than the reference temperature (No in Step 102), brightness is controlled to be constant (Step 103). When the light source temperature is higher than the reference temperature (Yes in Step 102), control for temperature suppression is performed (Step 104).

Figure 9:
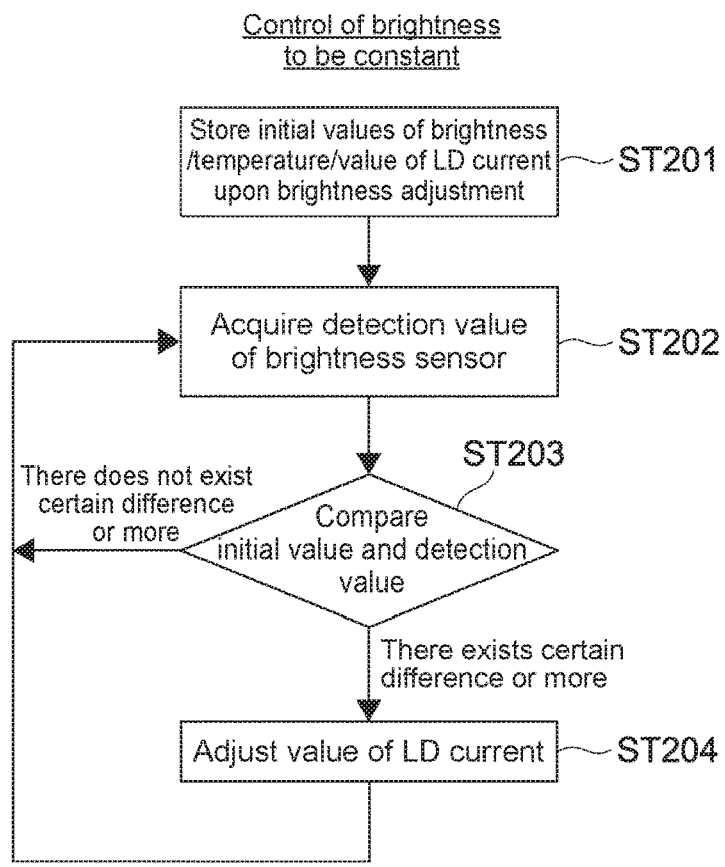
FIG. 9 is a flowchart illustrating an example of control of brightness to be constant.

FIG. 9 is a flowchart illustrating an example of control of brightness to be constant. The control of brightness to be constant is to control the light source section 100 such that the intensity of white light W emitted from the light source section 100 is maintained constant. First, initial values of brightness, a temperature, and a value of LD current upon brightness adjustment are stored in a memory or the like of the controller 490 (Step 201).

Note that, in the present disclosure, "constant" includes "substantially constant" in concept. In other words, "con-stant" is not limited to being in a fully constant state, and also includes being in a substantially constant state (such as being in a state in which the rate of change is within a range of +/−10%).

For example, brightness is adjusted, for example, when the image display apparatus 500 leaves a factory. For example, the value of LD current is controlled such that an image is displayed at a target brightness. When the image is displayed at the target brightness, the light source brightness and the light source temperature respectively detected by the brightness sensor 471 and the light source temperature sensor 472 are stored in the memory or the like as initial values. Further, the value of LD current at this point is also stored as an initial value.

Alternatively, brightness may be adjusted by a user. For example, a brightness adjustment mode is selected, and the brightness of an image is controlled using, for example, a button operation. In a state in which the image is displayed at a desired brightness, an operation is input that indicates that the adjustment is completed. A light source brightness, a light source temperature, and a value of LD current that are detected at this point are stored in the memory or the like as initial values.

Alternatively, a brightness value, a temperature, and a value of current that have been defined in advance may be stored in the memory or the like as initial values of the light source brightness, the light source temperature, and the value of LD current without brightness adjustment or the like being performed.

A light source brightness detected by the brightness sensor 471 is acquired (Step 202). The acquired light source brightness is compared with the initial value stored in the memory or the like (Step 203).

When there exists a certain difference or more between the initial value and the detection value, the value of LD current is adjusted (Step 204). For example, when the detection value is smaller than the initial value, the value of LD current is increased. This results in an increase in the intensity of blue laser light B2 emitted from the plurality of laser light sources 13, and in an increase in the brightness of white light W emitted from the light source section 100.

When the detection value is larger than the initial value, the value of LD current is decreased. This results in a decrease in the intensity of the blue laser light B2 emitted from the plurality of laser light sources 13, and in a decrease in the brightness of the white light W emitted from the light source section 100. When the control of the value of LD current is completed, the process returns to Step 202.

When there does not exist a certain difference or more between the initial value and the detection value, the value of LD current is not adjusted, and the process returns to Step 202. Brightness is controlled to be constant by repeating a loop of Steps 202, 203, and 204 at specified intervals.

A specific threshold or the like that defines the certain difference or more is not limited, and may be set discretionarily. Further, an amount of increase or decrease (a rate of increase or decrease) of the value of LD current with respect to a difference is also not limited, and may be set discretionarily. Typically, for example, the amount of increase or decrease of a value of LD current that is adjusted by performing a single loop may be fixed. Alternatively, the amount of increase or decrease may be controlled as appropriate for each loop depending on the magnitude of difference.

The control for temperature suppression illustrated in Step 104 of FIG. 7 is to control the light source section 100 such that an increase in the temperature of the light source section 100 is suppressed. A specific method for performing the control for temperature suppression is not limited, and any method that makes it possible to suppress an increase in the temperature of the light source section 100 may be adopted.

For example, it is possible to suppress an increase in light source temperature by controlling an increase rate (an increase amount) used to increase the value of LD current supplied to the plurality of laser light sources 13. For example, it is possible to suppress an increase in light source temperature by setting the increase rate to zero and preventing the value of LD current from being increased.

Further, it is also possible to suppress an increase in light source temperature by controlling a decrease rate used to decrease the value of LD current. For example, it is possible to suppress an increase in light source temperature by setting the decrease rate high and greatly decreasing the value of LD current. Of course, it is also possible to suppress an increase in light source temperature by stopping the supply of the value of LD current.

Figure 10:
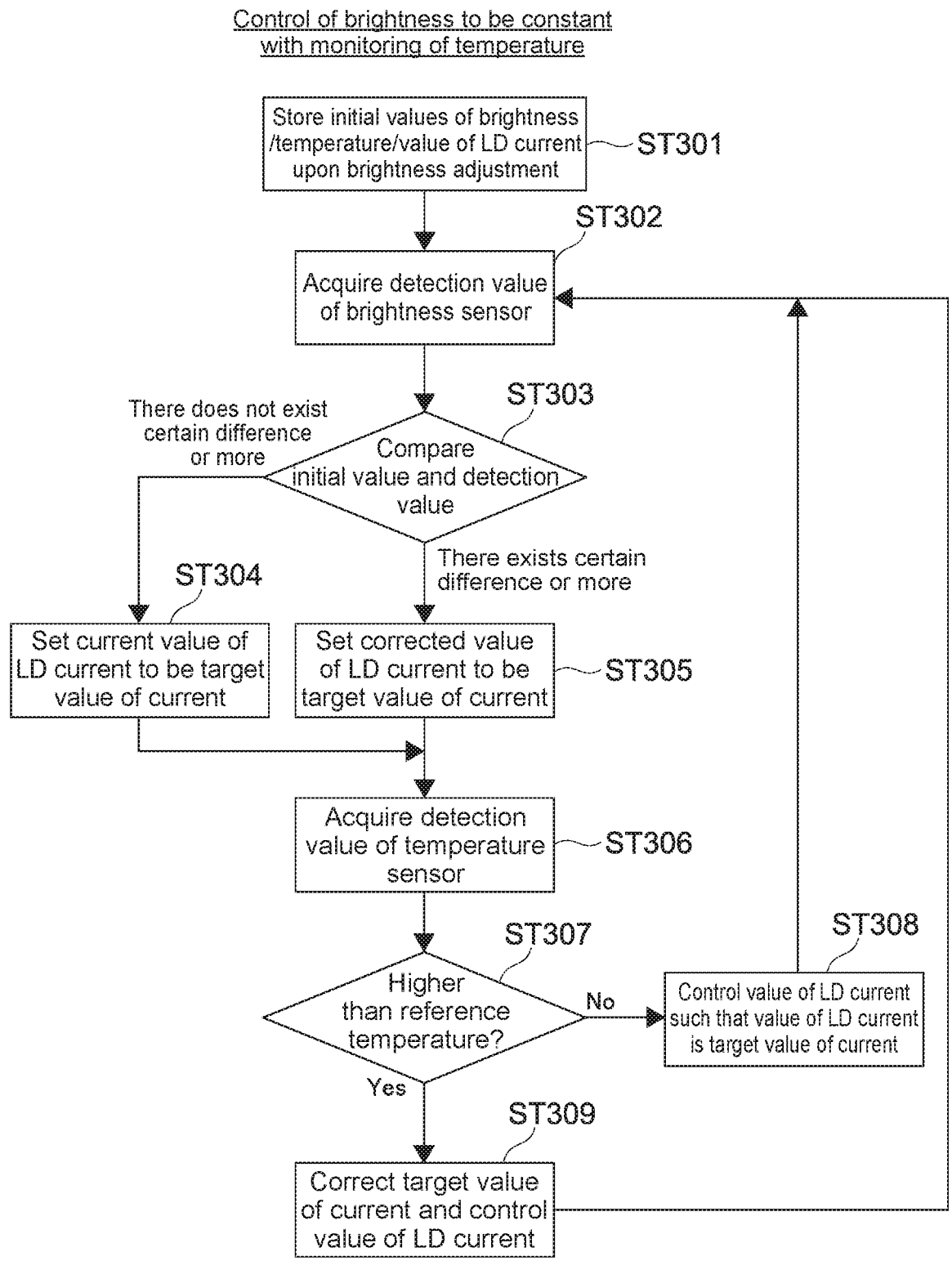
FIG. 10 is a flowchart illustrating an example of control of brightness to be constant with monitoring of a temperature.

FIG. 10 is a flowchart illustrating an example of control of brightness to be constant with monitoring of a temperature. The control of brightness to be constant with monitoring of a temperature is to maintain brightness of white light W constant while monitoring a light source temperature such that the light source temperature does not exceed an upper limit of a rated temperature.

In the present embodiment, when a light source brightness does not exceed a reference temperature, a normal control of brightness to be constant is performed. When the light source brightness exceeds the reference temperature, the light source section 100 is controlled such that the intensity of white light W emitted from the light source section 100 is maintained constant while an increase in the temperature of the light source section 100 is being suppressed. Note that this control is included in the control for temperature suppression.

First, initial values of brightness, a temperature, and a value of LD current upon brightness adjustment are stored in a memory or the like of the controller 490 (Step 301). A light source brightness detected by the brightness sensor 471 is acquired (Step 302). The acquired light source brightness is compared with the initial value stored in the memory or the like (Step 303).

When there does not exist a certain difference or more between the initial value and the detection value, a current value of LD current is set to be a target value of current (Step 304). The target value of current is a value of current of a target when the value of LD current is changed. Thus, Step 304 corresponds to maintenance of a current value of LD current.

When there exists a certain difference or more between the initial value and the detection value, a value obtained by correcting the current value of LD current is set to be the target value of current (Step 305). For example, when the detection value is smaller than the initial value, a value obtained by adding a specified correction value ΔI to the current value of LD current, is set to be the target value of current. When the detection value is larger than the initial value, a value obtained by subtracting the specified correction value ΔI from the current value of LD current, is set to be the target value of current.

The specific value for the correction value ΔI is not limited, and may be set discretionarily. Further, the correction value ΔI used to increase the value of LD current, and the correction value ΔI used to decrease the value of LD current may be the same value as each other, or may be different values from each other.

A light source temperature detected by the light source temperature sensor 472 is acquired (Step 306). It is determined whether the light source temperature is higher than a specified reference temperature (Step 307).

When the light source temperature is lower than the reference temperature (No in Step 307), the value of LD current supplied to the laser light source 13 is controlled such that the value of LD current is the target value of current, the target value of current being set in Step 304 or 305 (Step 308). Accordingly, the normal control of brightness to be constant is performed.

When the light source temperature is higher than the reference temperature (Yes in Step 302), the target value of current that is set in Step 304 or 305 is corrected. Then, the value of LD current supplied to the laser light source 13 is controlled such that the value of LD current is the corrected target value of current (Step 309). The target value of current is corrected such that the intensity of white light W emitted from the light source section 100 is maintained constant while an increase in the temperature of the light source section 100 is being suppressed.

Figure 11:
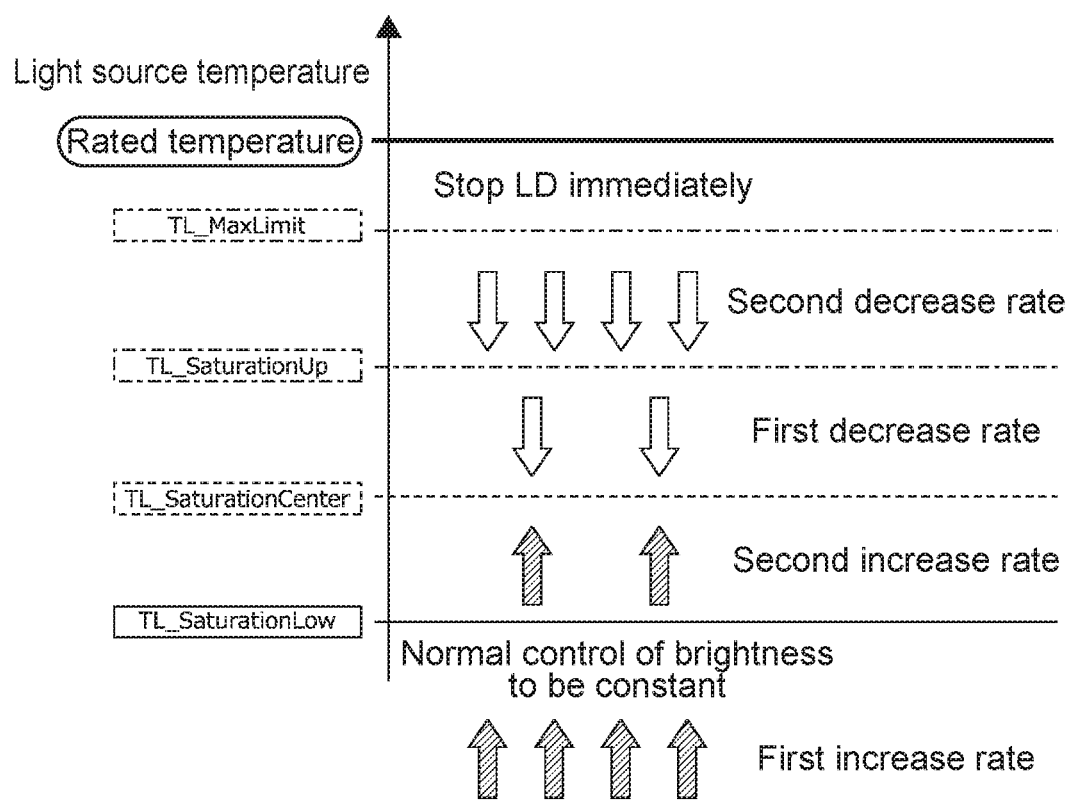
FIG. 11 is a schematic diagram describing an example of correcting a target value of current.

FIG. 11 is a schematic diagram describing an example of correcting a target value of current. In the present embodiment, four thresholds that are "TL_SaturationLow", "TL_SaturationCenter", "TL_SaturationUp", and "TL_MaxLimit" are set with respect to the light source temperature.

"TL_SaturationLow" corresponds to the specified reference temperature described with reference to FIGS. 8 to 10. "TL_SaturationCenter" corresponds to a first temperature that is higher than the specified reference temperature. "TL_SaturationUp" corresponds to a second temperature that is higher than the first temperature. "TL_MaxLimit" corresponds to a third temperature that is higher than the second temperature.

Values of a temperature that are set to be "TL_SaturationLow", "TL_SaturationCenter", "TL_SaturationUp", and "TL_MaxLimit" are not limited. For example, values smaller than an upper limit of a rated temperature (an upper limit of an operation guarantee temperature) are set to be the respective four thresholds, the upper limit of the rated temperature (the upper limit of the operation guarantee temperature) being used as a reference.

The following is an example of a setting method:

Rated temperature×95%="TL_MaxLimit"

Rated temperature×90%="TL_SaturationUp"

Rated temperature×85%="TL_SaturationCenter"

Rated temperature×80%="TL_SaturationLow"

Any other setting method may be adopted.

When the light source temperature is lower than "TL_SaturationLow", the determination performed in Step 307 is No, and the normal control of brightness to be constant is performed. Here, it is assumed that, in the normal control of brightness to be constant, an increase rate set to increase a value of LD current when the value of the light source brightness is smaller than the initial value, is a first increase rate. In the present embodiment, the first increase rate is an increase rate that is calculated by adding a specified correction value ΔI to a current value of LD current for each loop.

Note that the increase rate is defined as an increase rate of a value of LD current for a specified period of time. In other words, the increase rate is defined according to how much the value of LD current is increased for the specified period of time.

For example, when a loop is repeated to control the value of LD current, as in the present embodiment, it is possible to define the increase rate as an increase rate of the value of LD current during execution of, for example, a specified number of loops that is more than one. In the present embodiment, it is also possible to define the increase rate as an increase rate of the value of LD current when the value of the light source brightness is consecutively smaller than the initial value during execution of, for example, the specified number of loops that is more than one.

For example, not in the case of controlling the value of LD current in stages using a loop, but in the case of continuously controlling the value of LD current, it is also possible to define the increase rate by setting a specified period of time as appropriate.

When the light source temperature is within a range of from "TL_SaturationLow" to "TL_SaturationCenter", a second increase rate is set to be the increase rate used to increase the value of LD current, the second increase rate being lower than the first increase rate. In other words, a target temperature is corrected as appropriate such that the increase rate is lower than the first increase rate calculated by adding a specified correction value $\Delta I$ to a current value of LD current for each loop.

The following are examples of a method for reducing an increase rate of a value of LD current, that is, a method for reducing an increase rate of a value of LD current when the value of the light source brightness is consecutively smaller than the initial value during execution of, for example, a specified number of loops that is more than one.

For example, there is a method that includes adding, to a current value of LD current, a value smaller than a correction value $\Delta I$ added in the normal control of brightness to be constant; and newly setting a value obtained by the addition to be a target value of current. In other words, this is a method for adding, for each loop, a value smaller than the correction value $\Delta I$ to a current value of LD value.

Further, there is a method that includes adding a correction value $\Delta I$ to a current value of LD current and setting a value obtained by the addition to be a target value of current with respect to only one loop from among a plurality of loops; and setting the current value of LD current to be the target value of current with respect to the other loops. As described above, there are a method for making a value for increasing a current value of LD current smaller, and a method for reducing the number of times the current value of LD current is increased. Of course, these methods may be combined, or any other method that makes the increasing gradient gradual.

In the present embodiment, when the light source temperature is within the range of from "TL_SaturationLow" to "TL_SaturationCenter", first, the current value of LD current is set to be a target value of current, and the current is supplied to the laser light source 13. Thus, even if the value of the light source brightness is smaller than the initial value, first, the value of LD current remains maintained, and an improvement in brightness is prevented in principle.

However, when the light source temperature is within the range of from "TL_SaturationLow" to "TL_SaturationCenter" five times in a row, the target value of current set in Step 305 is adopted without a change at this point, and the current is supplied to the laser light source 13. In other words, the light source brightness is improved once every fifth time. This makes it possible to maintain brightness while monitoring a temperature. Of course, the improvement in brightness is not limited to the case of five times, and another number of times may be adopted.

Note that when the value of the light source brightness is larger than the initial value, a value obtained by subtracting a specified correction value $\Delta I$ from the current value of LD current, is set to be the target value of current, as in the normal control of brightness to be constant. Then, the value of LD current is controlled such that the value of LD current is the target value of current. This makes it possible to maintain brightness.

When the light source temperature is within a range of from "TL_SaturationCenter" to "TL_SaturationUp", an increase in the value of LD current supplied to the plurality of laser light sources 13 is prevented. In the present embodiment, the current value of LD current is set to be a target value of current, and the current is supplied to the laser light source 13.

It is assumed that, here, the light source temperature is within the range of from "TL_SaturationCenter" to "TL_SaturationUp" three times in a row. In this case, a value obtained by subtracting a specified correction value $\Delta I$ from the current value of LD current, is set to be the target value of current. The specified correction value $\Delta I$ may be the same as, or different from the correction value DI used in Step 305 when the value of the light source brightness is larger than the initial value.

As described above, in the present embodiment, when the light source temperature is within the range of from "TL_SaturationCenter" to "TL_SaturationUp", the value of LD current is not decreased to wait and see, and when the temperature is not decreased, the value of LD current is then decreased once every third time. This makes it possible to maintain brightness while monitoring a temperature. Of course, the decrease in a temperature is not limited to the case of three times, and another number of times may be adopted.

Here, a decrease rate of the value of LD current that is calculated by decreasing the value of LD current once every third time when the value of LD current is not decreased to wait and see and when the temperature is not decreased, is set to be a first decrease rate. Note that the decrease rate is defined as a decrease rate of a value of LD current for a specified period of time. In other words, the decrease rate is defined according to how much the value of LD current is decreased for the specified period of time.

For example, when a loop is repeated to control the value of LD current, as in the present embodiment, it is possible to define the decrease rate as a decrease rate of the value of LD current during execution of, for example, a specified number of loops that is more than one. For example, not in the case of controlling the value of LD current in stages using a loop, but in the case of continuously controlling the value of LD current, it is also possible to define the decrease rate by setting a specified period of time as appropriate.

When the light source temperature is within a range of from "TL_SaturationUp" to "TL_MaxLimit", the value of LD current is decreased using a second decrease rate that is higher than the first decrease rate. Examples of a method for increasing the decrease rate include a method for making a value for decreasing a current value of LD current larger, and a method for increasing the number of times the current value of LD current is decreased.

In the present embodiment, a value obtained by subtracting, for each loop, a specified correction value $\Delta I$ from the current value of LD current, is set to be the target value of current, and the current is supplied to the laser light source

13. In other words, the value of LD current is forced to be decreased for every turn. The specified correction value ΔI may be set as appropriate.

When the light source temperature is higher than "TL_MaxLimit", the value of LD current supplied to the plurality of laser light sources 13 is stopped, and driving of the laser light source 13 is stopped. In other words, when the light source temperature exceeds "TL_MaxLimit", the laser light source 13 is stopped immediately.

As described above, in the present embodiment, a target temperature is corrected as appropriate depending on which of the temperature ranges obtained by classification performed using the four thresholds the current light source temperature belongs to. When the light source temperature is higher than "TL_SaturationLow", the value of LD current is controlled while brightness is being controlled to be constant, such that the temperature converges toward "TL_SaturationCenter". This makes it possible to control the light source current while monitoring the light source temperature, and thus, it becomes possible to prevent the light source temperature from exceeding an upper limit of a rated temperature, and to prevent an early degradation or breakage of the laser light source 13.

As described above, in the image display apparatus 500 according to the present embodiment, the brightness of white light W and the temperature of the light source section 100 are respectively detected by the brightness sensor 471 and the light source temperature sensor 472. It is possible to accurately control the light source section 100 using these detection results.

The present technology makes it possible to control the light source section 100 considering a balance between a light source brightness and a light source temperature, and thus also makes it possible to maintain the light source brightness high, for example, within an acceptable range of the light source temperature. Further, a long life of the image display apparatus 500 is achieved, and this results in being able to provide a very high quality.

Further, in addition to the light source temperature being increased due to a portion of light source degradation and a portion of an increase in current, the light source temperature may be increased due to an increase in an environmental temperature (an outside temperature). For example, there may be a difference in light source temperature between the use in summer and the use in winter even if the value of LD current is controlled in a similar way. The present technology monitors a light source temperature, and thus it is possible to deal with an increase or a decrease in an environmental temperature, and to perform a highly accurate control on the light source section 100. In other words, it is possible to perform a control optimal for each season on the light source section 100.

Note that, for example, any machine learning algorithm using, for example, a deep neural network (DNN) may be used in order to generate and correct a target value of current according to a light source brightness and a light source temperature. For example, the use of artificial intelligence (AI) or the like that performs deep learning makes it possible to improve the accuracy in control of brightness to be constant with monitoring of a temperature.

State information regarding a state of the light source section 100 may be generated using a light source brightness detected by the brightness sensor 471, a light source temperature detected by the light source temperature sensor 472, and an environmental temperature (an outside temperature) detected by the environmental temperature sensor 473.

For example, it is possible to estimate a state of degradation caused by aging as the state information regarding a state of the light source section 100, on the basis of a change in the light source temperature with respect to an environmental temperature. For example, the laser light source 13 is driven with a value of LD current that is an initial value and has been stored in a memory or the like. In this state, a light source temperature and an environmental temperature are detected. A portion of the environmental temperature is subtracted from a difference between the initial value of the light source temperature and a current value of the light source temperature, and this results in being able to detect a portion of an increase in temperature due to a portion of light source degradation illustrated in A of FIG. 7. It is possible to estimate the state of degradation caused by aging on the basis of the portion of an increase in temperature. Of course, the initial value of an environmental temperature may be stored in a memory or the like, and may be used as appropriate.

As described above, by estimating a state of degradation caused by aging on the basis of a light source temperature, it is possible to notify a user of, for example, maintenance information, information regarding a usage state of the device, and information regarding a usage environment of the device.

Further, it is also possible to control the light source section 100 according to the estimated state of degradation caused by aging. For example, the correction value ΔI used in Step 305 of FIG. 10 may be changed as appropriate, for example, according to the state of degradation caused by aging. Furthermore, it is also possible to change, as appropriate and according to the state of degradation caused by aging, "TL_SaturationLow", "TL_SaturationCenter", "TL_SaturationUp", "TL_MaxLimit", and the correction value ΔI described above with reference to FIG. 11. This makes it possible to accurately control the light source section 100 according to the state of degradation caused by aging.

For example, the light source control section 491 illustrated in FIG. 2 serves as a generator and generates state information regarding a state of the light source section 100. Alternatively, the generator generating the state information regarding a state of the light source section 100 may be implemented independently of the light source control section 491 by the CPU of the controller 490 executing a specified program. Further, information other than the state of degradation caused by aging may be generated as the state of the light source section 100.

A specified machine learning algorithm may be used to generate state information regarding a state of the light source section 100 and to control the light source section 100 according to the state information.

OTHER EMBODIMENTS

The present technology is not limited to the embodiments described above, and may achieve other various embodiments.

In the descriptions above, the intensity (brightness) of emitted light is detected as a state of the emitted light. The configuration is not limited to this, and other parameters such as chromaticity and the shape of a pencil of light (including the size (the area of a cross section) of the pencil of light) may be detected as the state of the emitted light. Further, as the control of the light source section, control of chromaticity, control of a pencil of light, and the like may be performed while the light source temperature is being monitored. Of course, it is sufficient if a sensor (such as a chromaticity sensor) corresponding to a parameter desired to be acquired as a state of the light source is used.

The respective configurations of the image display apparatus, the light source section, the image generator, the projection section, and the like; the flows of controlling the light source section; and the like that have been described with reference to the respective figures are merely examples, and any modifications may be made thereto without departing from the spirit of the present technology. In other words, any other configuration, any other algorithm, and the like for carrying out the present technology may be adopted.

Further, at least two of the features according to the present technology described above can also be combined discretionarily. In other words, various features described in the respective embodiments may be combined discretionarily regardless of the embodiments. Further, the various effects described above are not limitative but are merely illustrative, and other effects may be provided.

Note that the present technology may also take the following configurations.

(1) An image display apparatus including:
a light source section that is capable of emitting emitted light;
a first sensor that is capable of detecting a state of the emitted light;
a second sensor that is capable of detecting a temperature of the light source section; and
a light source control section that is capable of controlling the light source section according to a first detection result of detection performed by the first sensor, and a second detection result of detection performed by the second sensor.

(2) The image display apparatus according to (1), in which
when the second detection result is lower than a specified reference temperature, the light source control section controls the light source section such that intensity of the emitted light emitted from the light source section is maintained constant.

(3) The image display apparatus according to (2), in which
when the second detection result is higher than the specified reference temperature, the light source control section controls the light source section such that an increase in the temperature of the light source section is suppressed.

(4) The image display apparatus according to (2) or (3), in which
when the second detection result is higher than the specified reference temperature, the light source control section controls the light source section such that the intensity of the emitted light emitted from the light source section is maintained constant while an increase in the temperature of the light source section is being suppressed.

(5) The image display apparatus according to any one of (1) to (4), in which
the light source section includes at least one light source that is driven by being supplied with current,
the second sensor detects a temperature of the at least one light source as the temperature of the light source section, and
the light source control section controls the current supplied to the at least one light source.

(6) The image display apparatus according to (5), in which
when the second detection result is higher than a specified reference temperature, the light source control section controls an increase rate used to increase the current supplied to the at least one light source.

(7) The image display apparatus according to (6), in which
when the second detection result is higher than a first temperature that is higher than the specified reference temperature, the light source control section prevents the current supplied to the at least one light source from being increased.

(8) The image display apparatus according to (7), in which
when the second detection result is lower than the specified reference temperature, the light source control section sets a first increase rate to be the increase rate used to increase the current supplied to the at least one light source.

(9) The image display apparatus according to (8), in which
when the second detection result is within a range of from the specified reference temperature to the first temperature, the light source control section sets a second increase rate to be the increase rate used to increase the current supplied to the at least one light source, the second increase rate being lower than the first increase rate.

(10) The image display apparatus according to any one of (7) to (9), in which
when the second detection result is within a range of from the first temperature to a second temperature that is higher than the first temperature, the light source control section decreases the current supplied to the at least one light source, using a first decrease rate.

(11) The image display apparatus according to (10), in which
when the second detection result is within a range of from the second temperature to a third temperature that is higher than the second temperature, the light source control section decreases the current supplied to the at least one light source, using a second decrease rate that is higher than the first decrease rate.

(12) The image display apparatus according to (11), in which
when the second detection result is higher than the third temperature, the light source control section stops the supply of the current to the at least one light source.

(13) The image display apparatus according to any one of (1) to (12), in which
a temperature that is lower than an upper limit of an operation guarantee temperature of the light source section is set to be the specified reference temperature, the upper limit of the operation guarantee temperature being used as a reference.

(14) The image display apparatus according to (2), in which
temperatures that are lower than an upper limit of an operation guarantee temperature of the light source section are respectively set to be the first temperature, the second temperature, and the third temperature, the upper limit of the operation guarantee temperature being used as a reference.

(15) The image display apparatus according to any one of (1) to (14), further including:
a third sensor that is capable of detecting an outside temperature; and
a generator that generates state information regarding a state of the light source section using the first detection result of detection performed by the first sensor, the second detection result of detection performed by the second sensor, and a third detection result of detection performed by the third sensor.

(16) The image display apparatus according to (15), further including a housing that includes an inlet used to intake outside air, in which
the third sensor is arranged near the inlet, and detects, as the outside temperature, a temperature of the outside air intaken from the inlet.

(17) The image display apparatus according to (15) or (16), in which
the light source control section controls the light source section according to the generated state information.
(18) The image display apparatus according to any one of (1) to (17), further including:
an image generator that generates an image using the emitted light emitted from the light source section; and
a projection section that projects the image generated by the image generator.

REFERENCE SIGNS LIST

W white light
W' leaked light of white light
13 laser light source
100 light source section
200 image generator
400 projection section
450 housing
452 inlet
470 sensor mechanism
471 brightness sensor
472 light source temperature sensor
473 environmental temperature sensor
490 controller
491 light source control section
500 image display apparatus

The invention claimed is:
1. An image display apparatus, comprising:
a light source configured to emit emitted light;
a first sensor configured to detect a first value indicating a state of the emitted light;
a second sensor configured to detect a second value indicating a temperature adjacent to the light source; and
light source control circuitry configured to set an amount of current supplied to the light source by analyzing a combination of both the first value, being a first detection result of detection performed by the first sensor, and the second value, being a second detection result of detection performed by the second sensor,
wherein the light control circuitry is further configured to set a first target amount of current based on the first detection result and a stored initial brightness value, adjust the first target amount of current to a second target amount of current based on the second detection result, and control the current supplied to the light source based on the adjusted second target amount of current; and
when the second detection result is higher than a specified reference temperature, the light source control circuity is further configured to control an increase rate used to increase the current supplied to the light source.
2. The image display apparatus according to claim 1, wherein
when the second detection result is lower than a specified reference temperature, the light source control circuitry is further configured to control the light source such that an intensity of the emitted light emitted from the light source is maintained constant.
3. The image display apparatus according to claim 2, wherein
when the second detection result is higher than the specified reference temperature, the light source control circuitry is further configured to control the light source such that an increase in the temperature of the light source is suppressed.
4. The image display apparatus according to claim 2, wherein
when the second detection result is higher than the specified reference temperature, the light source control circuitry is further configured to control the light source such that the intensity of the emitted light emitted from the light source is maintained constant while an increase in the temperature of the light source is being suppressed.
5. The image display apparatus according to claim 1, wherein when the second detection result is higher than a first temperature that is higher than the specified reference temperature, the light source control circuitry is further configured to prevent the current supplied to the light source from being increased.
6. The image display apparatus according to claim 5, wherein
when the second detection result is lower than the specified reference temperature, the light source control circuity is further configured to set a first increase rate to be the increase rate used to increase the current supplied to the light source.
7. The image display apparatus according to claim 6, wherein
when the second detection result is within a range of from the specified reference temperature to the first temperature, the light source control circuitry is further configured to set a second increase rate to be the increase rate used to increase the current supplied to the light source, the second increase rate being lower than the first increase rate.
8. The image display apparatus according to claim 5, wherein
when the second detection result is within a range of from the first temperature to a second temperature that is higher than the first temperature, the light source control circuitry is further configured to decrease the current supplied to the light source, using a first decrease rate.
9. The image display apparatus according to claim 8, wherein
when the second detection result is within a range of from the second temperature to a third temperature that is higher than the second temperature, the light source control circuitry is further configured to decrease the current supplied to the light source, using a second decrease rate that is higher than the first decrease rate.
10. The image display apparatus according to claim 9, wherein
when the second detection result is higher than the third temperature, the light source control circuitry is further configured to stop the supply of the current to the light source.
11. The image display apparatus according to claim 2, wherein
a temperature that is lower than an upper limit of an operation guarantee temperature of the light source is set to be the specified reference temperature used by the light source control circuitry, the upper limit of the operation guarantee temperature being used as a reference.

12. The image display apparatus according to claim 10, wherein
temperatures that are lower than an upper limit of an operation guarantee temperature of the light source are respectively set by the light source control circuitry to be the first temperature, the second temperature, and the third temperature, the upper limit of the operation guarantee temperature being used as a reference.

13. The image display apparatus according to claim 1, further comprising:
a third sensor configured to detect an outside temperature; and
a generator configured to generate state information regarding a state of the light source using the first detection result of detection performed by the first sensor, the second detection result of detection performed by the second sensor, and a third detection result of detection performed by the third sensor.

14. The image display apparatus according to claim 13, further comprising a housing that includes an inlet used to intake outside air, wherein
the third sensor is arranged near the inlet, and detects, as the outside temperature, a temperature of the outside air intaken from the inlet.

15. The image display apparatus according to claim 13, wherein
the light source control circuitry is further configured to control the light source according to the generated state information.

16. The image display apparatus according to claim 1, further comprising:
an image generator configured to generate an image using the emitted light emitted from the light source; and
a projection apparatus configured to project the image generated by the image generator.

17. The image display apparatus of claim 1, wherein the first sensor is a brightness sensor configured to detect an intensity of the emitted light.

18. An image display apparatus, comprising:
a light source configured to emit emitted light;
a first sensor configured to detect a first value indicating a state of the emitted light;
a second sensor configured to detect a second value indicating a temperature adjacent to the light source; and
light source control circuitry configured to control an amount of current supplied to the light source based on a combination of both the first value, being a first detection result of detection performed by the first sensor, and the second value, being a second detection result of detection performed by the second sensor,
wherein the light source control circuitry is further configured to first set a target amount of current supplied to the light source based on the first value and then, after setting the target amount of current based on the first value, when determining that the second value is lower than a specified reference temperature, control the light source such that an intensity of the emitted light emitted from the light source is maintained constant.

19. An image display apparatus, comprising:
a light source configured to emit emitted light;
a first sensor configured to detect a first value indicating a state of the emitted light;
a second sensor configured to detect a second value indicating a temperature adjacent to the light source; and
light source control circuitry configured to set an amount of current supplied to the light source by analyzing a combination of both the first value, being a first detection result of detection performed by the first sensor, and the second value, being a second detection result of detection performed by the second sensor,
wherein the light control circuitry is further configured to set a first target amount of current based on the first detection result and a stored initial brightness value, adjust the first target amount of current to a second target amount of current based on the second detection result, and control the current supplied to the light source based on the adjusted second target amount of current; and
wherein when the second detection result is higher than a first temperature that is higher than a specified reference temperature, the light source control circuitry is further configured to prevent the current supplied to the light source from being increased.

* * * * *